US012676343B2

(12) United States Patent
Choi et al.

(10) Patent No.: US 12,676,343 B2
(45) Date of Patent: Jul. 7, 2026

(54) ANODE-FREE ALL-SOLID-STATE BATTERY CAPABLE OF OPERATING AT LOW TEMPERATURE AND METHOD OF MANUFACTURING THE SAME

(71) Applicants: Hyundai Motor Company, Seoul (KR); Kia Corporation, Seoul (KR); SEOUL NATIONAL UNIVERSITY R&DB FOUNDATION, Seoul (KR)

(72) Inventors: Seung Ho Choi, Hwaseong (KR); Sang Heon Lee, Yongin (KR); Ga Hyeon Im, Hwaseong (KR); Yun Sung Kim, Hwaseong (KR); Jang Wook Choi, Seoul (KR); Ji Eun Lee, Seongnam (KR)

(73) Assignees: Hyundai Motor Company, Seoul (KR); Kia Corporation, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 810 days.

(21) Appl. No.: 17/847,384

(22) Filed: Jun. 23, 2022

(65) Prior Publication Data

US 2022/0416307 A1      Dec. 29, 2022

(30) Foreign Application Priority Data

Jun. 23, 2021      (KR) ........................ 10-2021-0081703

(51) Int. Cl.
H01M 10/0585 (2010.01)
H01M 4/02 (2006.01)
(Continued)

(52) U.S. Cl.
CPC ..... H01M 10/0585 (2013.01); H01M 4/0404 (2013.01); H01M 4/622 (2013.01);
(Continued)

(58) Field of Classification Search
CPC ........... H01M 10/0585; H01M 4/0404; H01M 4/622; H01M 10/052; H01M 2004/021;
(Continued)

(56) References Cited

U.S. PATENT DOCUMENTS

2002/0086213 A1*   7/2002   Utsugi ..................... H01M 4/13
                                                            429/231.95
2019/0214685 A1*   7/2019   Chang ................... H01M 4/382
(Continued)

FOREIGN PATENT DOCUMENTS

CN          108565398 A  *  9/2018    ............. H01M 4/13
EP          3783717 A1    2/2021
(Continued)

OTHER PUBLICATIONS

CN-108565398-A Translation (Year: 2018).*
(Continued)

*Primary Examiner* — Matthew T Martin
*Assistant Examiner* — Kevin Song
(74) *Attorney, Agent, or Firm* — Fox Rothschild LLP

(57) ABSTRACT

Disclosed are an anode-free all-solid-state battery which may operate at low temperature conditions, such as room temperature, and a method manufacturing the same. The anode-free all-solid-state battery may have uniformly deposited lithium during charging and inhibit the growth of lithium dendrites.

12 Claims, 7 Drawing Sheets

(51) Int. Cl.
| | |
|---|---|
| *H01M 4/04* | (2006.01) |
| *H01M 4/62* | (2006.01) |
| *H01M 10/052* | (2010.01) |

(52) U.S. Cl.
CPC .... *H01M 10/052* (2013.01); *H01M 2004/021* (2013.01); *H01M 2300/0065* (2013.01)

(58) Field of Classification Search
CPC .......... H01M 2300/0065; H01M 4/13; H01M 2220/20; H01M 2300/0068; H01M 2300/0071; H01M 4/134; H01M 4/1395; H01M 4/36; H01M 4/366; H01M 4/38; H01M 4/382; H01M 4/58; H01M 4/62; H01M 4/623; H01M 4/625; H01M 4/661; H01M 4/667; H01M 10/0525; H01M 10/0562; H01M 10/4235; Y02E 60/10; Y02P 70/50
See application file for complete search history.

(56) References Cited

U.S. PATENT DOCUMENTS

| | | | |
|---|---|---|---|
| 2019/0260066 A1 | 8/2019 | Hu et al. | |
| 2020/0144599 A1* | 5/2020 | Lee ...................... | H01M 4/602 |
| 2020/0220220 A1 | 7/2020 | Martin et al. | |
| 2021/0020949 A1* | 1/2021 | Du ................... | H01M 10/0562 |

FOREIGN PATENT DOCUMENTS

| | | |
|---|---|---|
| KR | 2018-0091678 A | 8/2018 |
| KR | 2019-0001556 A | 1/2019 |
| KR | 2020-0052707 A | 5/2020 |
| KR | 2021-0071249 A | 6/2021 |
| WO | 2021/021772 A1 | 2/2021 |

OTHER PUBLICATIONS

Pathak, R., Chen, K., Gurung, A. et al. Fluorinated hybrid solid-electrolyte-interphase for dendrite-free lithium deposition. Nature Communications, 11, 93 (2020).

* cited by examiner

ANODE-FREE ALL-SOLID-STATE BATTERY CAPABLE OF OPERATING AT LOW TEMPERATURE AND METHOD OF MANUFACTURING THE SAME

CROSS-REFERENCE TO RELATED APPLICATION

This application claims under 35 U.S.C. § 119(a) the benefit of priority to Korean Patent Application No. 10-2021-0081703, filed on Jun. 23, 2021, the entire contents of which are incorporated herein by reference.

TECHNICAL FIELD

The present invention relates to an anode-free all-solid-state battery operating at low temperatures and including uniformly deposited lithium during charging, and inhibiting the growth of lithium dendrites.

BACKGROUND

An all-solid-state battery has a three-layered laminate structure including a cathode active material layer bonded to a cathode current collector, an anode active material layer bonded to an anode current collector, and a solid electrolyte interposed between the cathode active material layer and the anode active material layer.

In general, an anode active material layer of an all-solid-state battery has been formed by mixing an anode active material with a solid electrolyte for securing ionic conductivity. Such a conventional all-solid-state battery has lower energy density than a lithium ion battery since the solid electrolyte has a higher specific gravity than a liquid electrolyte.

In an attempt to increase the energy density of all-solid-state batteries, research has been conducted on the use of lithium metal as an anode. However, there are problems such as interfacial bonding, lithium dendrite growth, price, and difficulty increasing the area thereof.

Recently, research has been made on an anode-free all-solid-state battery lacking an anode, in which lithium is directly deposited on an anode collector. However, the battery has a problem in that the rate of an irreversible reaction gradually increases due to nonuniform lithium precipitation, so the lifespan and durability thereof are seriously deteriorated.

In the related art, an attempt was made to coat the anode current collector with a metal powder, but satisfactory results were not obtained; for example, metal and lithium aggregated during the charging process.

The above information disclosed in this Background section is only for enhancement of understanding of the background of the invention, and therefore it may contain information that does not form the prior art that is already known in this country to a person of ordinary skill in the art.

SUMMARY

In one preferred aspect, provided is an anode-free all-solid-state battery having deposited lithium on an anode current collector during charging.

A term "anode-free lithium ion battery," "anodeless lithium ion battery," "anode-free battery," or "anodeless battery" as used herein refers to a lithium ion battery including a bare current collector at its anode side, which is in contrast to a lithium ion battery that uses lithium metal as an anode. The anode-free lithium ion battery includes a current collector including anode active material, which may be bonded, coated, attached, sprayed, painted or applied on the surface of the current collector. Preferably, the anode active material is coated on the surface of the current collector and formed as a layer or film.

In one preferred aspect, provided is an anode-free all-solid-state battery inhibiting the growth of lithium dendrites during charging.

In one preferred aspect, provided is an anode-free all-solid-state battery exhibiting sufficient capacity and lifespan even when operating at low temperatures.

The objects of the present invention are not limited to those described above. Other objects of the present invention will be clearly understood from the following description, and are able to be implemented by means defined in the claims and combinations thereof.

In an aspect, provided is an anode-free all-solid-state battery including a solid electrolyte layer, a cathode layer disposed on a first surface of the solid electrolyte layer, the cathode layer including a cathode active material, an anode current collector disposed on a second surface of the solid electrolyte layer, and a coating layer disposed between the anode current collector and the solid electrolyte layer, the coating layer including a metal fluoride.

The first surface of the solid electrolyte layer and the second surface of the solid electrolyte layer face in opposite direction.

The metal fluoride may include a compound having Formula 1:

$$MF_x \tag{Formula 1}$$

wherein M includes one or more selected from the group consisting of Zn, In, Ag, Mg, Ca, Sn, Bi, Sb, Ga, Ge, and Al, and x is an integer from 1 to 4.

The metal fluoride may suitably include $InF_3$.

The metal fluoride may suitably include $ZnF_2$.

The metal fluoride may suitably include AgF.

The metal fluoride may have a particle size (D50) of about 10 nm to 5 μm.

The "particle" as used herein refers to a substance including aggregated or multiple number of a compound with or without regularity in shape or size. The "particle size" may be preferably measured by maximum diameter between two points on the surface of the particle.

The coating layer may further include one or more binder selected from butadiene rubber (BR), nitrile butadiene rubber (NBR), hydrogenated nitrile butadiene rubber (HNBR), polyvinylidene difluoride (PVDF), polytetrafluoroethylene (PTFE), carboxymethylcellulose (CMC), and polyethylene oxide (PEO).

The coating layer may include an amount of about 90 to 99% by weight of the metal fluoride and an amount of about 1 to 10% by weight of the binder.

The coating layer may not include a carbon material.

The coating layer may have a thickness of about 0.1 μm to 20 μm.

When charging the anode-free all-solid-state battery, a lithium storage layer containing lithium metal, a lithium alloy, and lithium fluoride (LiF) may be formed between the solid electrolyte layer and the anode current collector.

The anode-free all-solid-state battery may have a capacity of about 140 mAh/g or more based on the weight of the cathode active material when operated at a temperature of about 10° C. to 50° C.

The anode-free all-solid-state battery may have a capacity retention of about 80% or greater for 30 charge/discharge cycles when operated at a temperature of about 10° C. to 50° C.

In another aspect, provided is a method of manufacturing an anode-free all-solid-state battery. The method includes including preparing a slurry including metal fluoride, a binder, and a solvent; applying the slurry onto an anode current collector to form a coating layer, forming a solid electrolyte layer on the coating layer, and forming a cathode layer including a cathode active material on the solid electrolyte layer.

The solvent component may include one or more selected from the group consisting of N-methyl pyrrolidone (NMP), water, ethanol, isopropanol, and dimethylsulfoxide (DMSO).

The slurry may have a solid content of about 1 to 20% by weight based on the total weight of the slurry.

In additional aspects, vehicles are provided that comprise one or more batteries as disclosed herein.

Other aspects and preferred embodiments of the invention are discussed infra.

BRIEF DESCRIPTION OF THE DRAWINGS

The above and other features of the present invention will now be described in detail with reference to certain exemplary embodiments thereof, illustrated in the accompanying drawings which are given hereinbelow by way of illustration only, and thus are not limitative of the present invention, and wherein.

DETAILED DESCRIPTION

Figure 1:
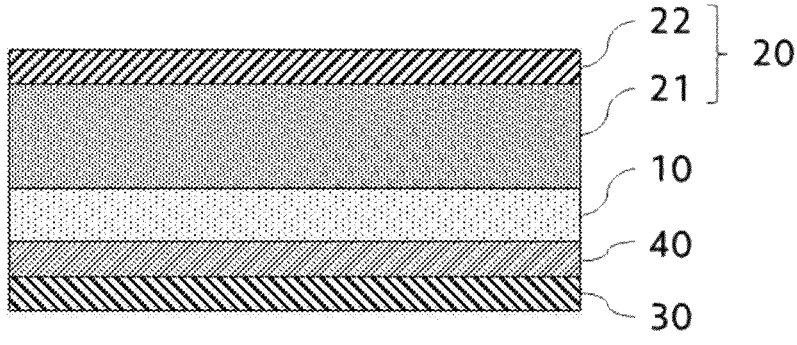
FIG. 1 shows an exemplary all-solid-state battery according to an exemplary embodiment of the present invention.

The objects described above, as well as other objects, features and advantages, will be clearly understood from the following preferred embodiments with reference to the attached drawings. However, the present invention is not limited to the embodiments, and may be embodied in different forms. The embodiments are suggested only to offer a thorough and complete understanding of the disclosed context and to sufficiently inform those skilled in the art of the technical concept of the present invention.

Like reference numbers refer to like elements throughout the description of the figures. In the drawings, the sizes of structures may be exaggerated for clarity. It will be understood that, although the terms "first", "second", etc. may be used herein to describe various elements, these elements should not be construed as being limited by these terms, which are used only to distinguish one element from another. For example, within the scope defined by the present invention, a "first" element may be referred to as a "second" element, and similarly, a "second" element may be referred to as a "first" element. Singular forms are intended to include plural forms as well, unless the context clearly indicates otherwise.

It will be further understood that terms such as "comprise" or "has", when used in this specification, specify the presence of stated features, integers, steps, operations, elements, components or combinations thereof, but do not preclude the presence or addition of one or more other features, integers, steps, operations, elements, components, or combinations thereof. In addition, it will be understood that, when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all such numbers, figures and/or expressions. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are disclosed in the description, these ranges are continuous, and include all numbers from the minimum to the maximum, including the maximum within each range, unless otherwise defined.

Furthermore, when the range refers to an integer, it includes all integers from the minimum to the maximum, including the maximum within the range, unless otherwise defined. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 shows an exemplary all-solid-state battery according to the present invention. The all-solid-state battery may include a solid electrolyte layer 10, a cathode layer 20 disposed on a first surface of the solid electrolyte layer 10, the cathode layer including a cathode active material, an anode current collector 30 disposed on a second surface of the solid electrolyte layer 10, and a coating layer 40 disposed between the anode current collector 30 and the solid electrolyte layer 10, the coating layer including a metal fluoride.

The first surface of the solid electrolyte layer and the second surface of the solid electrolyte layer face in opposite direction.

The solid electrolyte layer 10 is disposed between the cathode layer 20 and the anode current collector 30 to allow lithium ions to move therebetween.

The solid electrolyte layer 10 may suitably include an oxide solid electrolyte or a sulfide solid electrolyte. However, preferred is the use of a sulfide solid electrolyte, which has high lithium ion conductivity. The sulfide solid electrolyte is not particularly limited, but may suitably include $Li_2S$—$P_2S_5$, $Li_2$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (wherein m and n are positive numbers and Z is one of Ge, Zn, and Ga), $Li_2S$—$GeS_2$, $Li_2S$—$SiS_2$—$Li_3PO_4$, $Li_2S$—$SiS_2$-$Li_xMO_y$ (wherein x and y are positive numbers and M is one of P, Si, Ge, B, Al, Ga, and In), $Li_{10}GeP_2S_{12}$, or the like.

The cathode layer 20 may include a cathode active material layer 21 including a cathode active material and a cathode current collector 22 disposed on the cathode active material layer 21.

The cathode active material layer 21 may include a cathode active material, a solid electrolyte, a conductive material, a binder, and the like.

The cathode active material may suitably include an oxide active material or a sulfide active material.

The oxide active material may suitably include a rock-salt-layer-type active material such as $LiCoO_2$, $LiMnO_2$, $LiNiO_2$, $LiVO_2$, or $Li_{1+x}Ni_{1/3}Co_{1/3}Mn_{1/3}O_2$, a spinel-type active material such as $LiMn_2O_4$ or $Li(Ni_{0.5}Mn_{1.5})O_4$, a reverse-spinel-type active material such as $LiNiVO_4$ or $LiCoVO_4$, an olivine-type active material such as $LiFePO_4$, $LiMnPO_4$, $LiCoPO_4$, or $LiNiPO_4$, a silicon-containing active material such as $Li_2FeSiO_4$ or $Li_2MnSiO_4$, a rock-salt-layer-type active material having a transition metal, a portion of which is substituted with a heterogeneous metal such as $LiNi_{0.8}Co_{(0.2-x)}Al_xO_2$ (0<x<0.2), a spinel-type active material having a transition metal, a portion of which is substituted with a heterogeneous metal such as $Li_{1+x}Mn_{2-x-y}M_yO_4$ (wherein M includes one or more of Al, Mg, Co, Fe, Ni, Zn, and 0<x+y<2), and lithium titanate, such as $Li_4T_{15}O_{12}$.

The sulfide active material may suitably include copper Chevrel, iron sulfide, cobalt sulfide, nickel sulfide, or the like.

The solid electrolyte may suitably include an oxide solid electrolyte or a sulfide solid electrolyte. However, preferred is the use of a sulfide solid electrolyte, having high lithium ion conductivity. The sulfide solid electrolyte is not particularly limited, but may suitably include $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (wherein m and n are positive numbers and Z is one of Ge, Zn and Ga), $Li_2S$—$GeS_2$, $Li_2S$—$SiS_2$—$Li_3PO_4$, $Li_2S$—$SiS_2$-$Li_xMO_y$ (wherein x and y are positive numbers and M is one of P, Si, Ge, B, Al, Ga, and In), $Li_{10}GeP_2S_{12}$, or the like.

The conductive material may suitably include carbon black, conductive graphite, ethylene black, graphene, or the like.

The binder may suitably include butadiene rubber (BR), nitrile butadiene rubber (NBR), hydrogenated nitrile butadiene rubber (HNBR), polyvinylidene difluoride (PVDF), polytetrafluoroethylene (PTFE), carboxymethylcellulose (CMC), or the like.

The cathode current collector 22 may be a plate-shaped substrate having electrical conductivity. The cathode current collector 22 may include aluminum foil.

The anode current collector 30 may be a plate-shaped substrate having electrical conductivity. The anode current collector 30 may include one or more of nickel (Ni), stainless steel (SUS), and combinations thereof.

The anode current collector 30 may be a high-density metal thin film having porosity less than about 1%.

The anode current collector 30 may have a thickness of about 1 μm to 20 μm, or particularly of about 5 μm to 15 μm.

The coating layer 40 allows lithium ions migrated from the cathode active material layer 21 to be uniformly deposited between the solid electrolyte layer 10 and the anode current collector 40 during charging of the all-solid-state battery. In addition, the coating layer 40 may inhibit the growth of lithium dendrites and internal short circuits. A detailed description thereof will be given later.

The coating layer 40 may include a metal fluoride. The metal fluoride may include a compound having Formula 1 below:

$$MF_x \qquad \text{[Formula 1]}$$

wherein M includes a metal element having a property of forming an alloy with lithium, and specifically includes one or more selected from the group consisting of Zn, In, Ag, Mg, Ca, $S_n$, Bi, Sb, Ga, Ge, and Al; and x is an integer of 1 to 4.

Preferably, the metal fluoride may suitably include $InF_3$, $ZnF_2$, or AgF.

For example, the metal fluoride may be $InF_3$, $ZnF_2$, or AgF.

Figure 2:
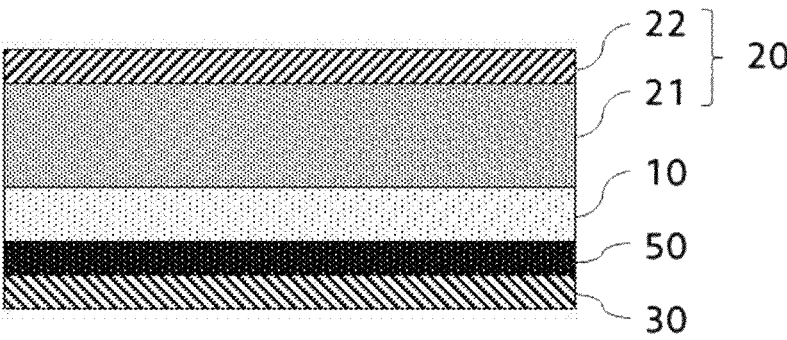
FIG. 2 shows the state in which an all-solid-state battery according to an exemplary embodiment of the present invention is charged.

FIG. 2 shows the state in which the all-solid-state battery according to an exemplary embodiment of the present invention is charged. The all-solid-state battery may include a lithium storage layer 50 between the solid electrolyte layer 10 and the anode current collector 30.

Lithium ions that have migrated from the cathode active material layer 21 are introduced into the coating layer 40 shown in FIG. 1 through the solid electrolyte layer 10. The metal fluoride included in the coating layer 40 undergoes an electrochemical reaction with the lithium ions as shown in Reaction Schemes 1 and 2 below.

$$MF_x + xLi^+ \rightarrow M + xLiF \qquad \text{[Reaction Scheme 1]}$$

wherein x is an integer of 1 to 4.

$$M + Li^+ \rightarrow M\text{-}Li \text{ (Alloy)} \qquad \text{[Reaction Scheme 2]}$$

Specifically, metal fluoride ($MF_x$) reacts with a lithium ion ($xLi^+$) to form metal fluoride (LiF) and metal (M) as shown in Reaction Scheme 1, and the metal (M) reacts with another lithium ion ($Li^+$) to form a lithium alloy.

As a result, the lithium storage layer 50 may include lithium metal, a lithium alloy, and lithium fluoride (LiF).

The lithium alloy stores lithium ions and serves as seeds to allow the lithium ions to be deposited into lithium metal.

The lithium fluoride (LiF) may inhibit the growth of lithium dendrites during charging and prevents aggregation of metal resulting from metal fluoride. For example, the lithium fluoride (LiF) serves as a protective film and allows lithium metal and a lithium alloy to be uniformly deposited, thereby enabling reversible charge/discharge reactions.

When an all-solid-state battery is discharged, reactions reverse to those depicted in Reaction Formulas 1 and 2 occur, thereby enabling reversible charging and discharging.

The metal fluoride may have a particle size (D50) of about 10 nm to 5 μm. When the particle size (D50) of the metal fluoride powder is greater than about 5 μm, the particle size of lithium fluoride and the lithium alloy formed from the metal fluoride, becomes excessively large, and thus the above-described effect may not be obtained.

The coating layer 40 may further include a binder to realize adhesion between metal fluoride particles. The binder may be any example thereof that is widely used in the technical field to which the present invention pertains, and may, for example, suitably include one or more binder selected from the group consisting of butadiene rubber (BR), nitrile butadiene rubber (NBR), hydrogenated nitrile butadiene rubber (HNBR), polyvinylidene difluoride (PVDF), polytetrafluoroethylene (PTFE), carboxymethylcellulose (CMC), and polyethylene oxide (PEO).

The coating layer may suitably include an amount of about 90 to 99% by weight of the metal fluoride and an amount of about 1 to 10% by weight of the binder based on the total weight of the coating layer. When the content of the binder is less than about 1% by weight, adhesion may not be sufficient, and when the content is greater than about 10% by weight, the movement of lithium ions may be inhibited.

The coating layer 40 does not include a separate carbon material. A conventional anode-free all-solid-state battery uses a carbon material or the like to provide a space where lithium can be precipitated or deposited. According to various exemplary embodiments of the present invention, reversible charging/discharging may be performed without using a separate carbon material because lithium alloys, formed by the reaction of a metal element resulting from a metal fluoride and lithium ions, and lithium ions are precipitated or deposited in the form of lithium metals grown based on lithium alloys, and the lithium fluoride effectively prevents aggregation of the lithium alloys and elemental metal.

The coating layer may have a thickness of about 0.1 μm to 20 μm. When the thickness of the coating layer 40 is less than about 0.1 μm, the effect described above may not be obtained due to insufficient content of the metal fluoride, and when the thickness is higher than about 20 μm, reversible charging/discharging may be difficult due to the excessively great thickness.

The method of manufacturing an anode-free all-solid-state battery includes preparing a slurry containing a metal fluoride, a binder, and a solvent component, applying the slurry onto an anode current collector to form a coating layer, forming a solid electrolyte layer on the coating layer, and forming a cathode layer including a cathode active material on the solid electrolyte layer.

The metal fluoride, binder, solid electrolyte layer, cathode layer, and the like have been described above, and a detailed description thereof will be omitted below.

The solvent component is not particularly limited, and any solvent component may be used, so long as it is capable of dispersing the metal fluoride and the binder. For example, the solvent component may suitably include one or more selected from the group consisting of N-methyl pyrrolidone (NMP), water, ethanol, isopropanol, and dimethylsulfoxide (DMSO).

The slurry may have a solid content of about 1 to 20% by weight. When the solid content is within the range described above, the coating layer can be more easily formed.

The solid electrolyte layer may be formed using a slurry containing a solid electrolyte or by pressing a powdery solid electrolyte. In addition, the cathode layer may be formed using a slurry containing the cathode active material or by pressurizing a powdery solid electrolyte.

The steps of forming the coating layer, the solid electrolyte layer, and the anode layer are not described in chronological order, and each element may be formed simultaneously or sequentially. In addition, the manufacturing method may include not only directly forming the solid electrolyte layer on the coating layer and the cathode layer on the solid electrolyte layer, but also forming respective elements separately and then laminating the same in the structure shown in FIG. 1.

EXAMPLE

Hereinafter, the present invention will be described in more detail with reference to specific examples. However, the following examples are provided only for better understanding of the present invention, and thus should not be construed as limiting the scope of the present invention.

Example 1

Stainless steel (SUS) was used as an anode current collector.

InF$_3$ as a metal fluoride and PVDF as a binder were added to NMP as a solvent component to prepare a slurry, and the slurry was applied onto the anode current collector to form a coating layer.

A lithium metal, a solid electrolyte layer, and an anode current collector having the coating layer formed thereon were laminated in this order to produce a half-battery.

The half-battery was charged and discharged at a temperature of about 60° C. under the conditions of a current density of 1 mA/cm$^2$ and a deposition capacity of 3 mAh/cm$^2$.

Figure 3A:
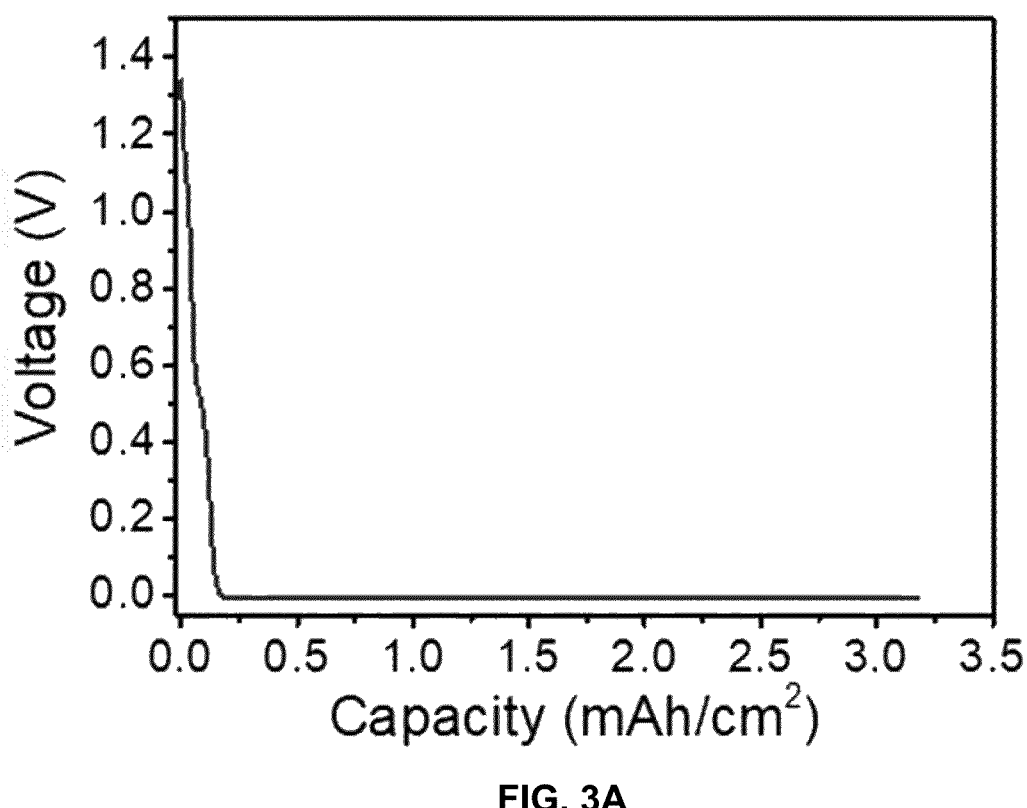
FIG. 3A shows a first discharge graph of a half-battery in Example 1 according to an exemplary embodiment of the present invention.

FIG. 3A is a first discharge graph of the half-battery. As can be seen from FIG. 3A, the half-battery exhibited a capacity of 0.2 mAh/cm$^2$ at a voltage greater than 0V during initial discharge. This means that InF$_3$ reacted electrochemically with lithium ions. In addition, it can be seen that when the coating layer containing InF$_3$ is introduced, the half-battery is stably operated at 0V or less without overvoltage.

Figure 3B:
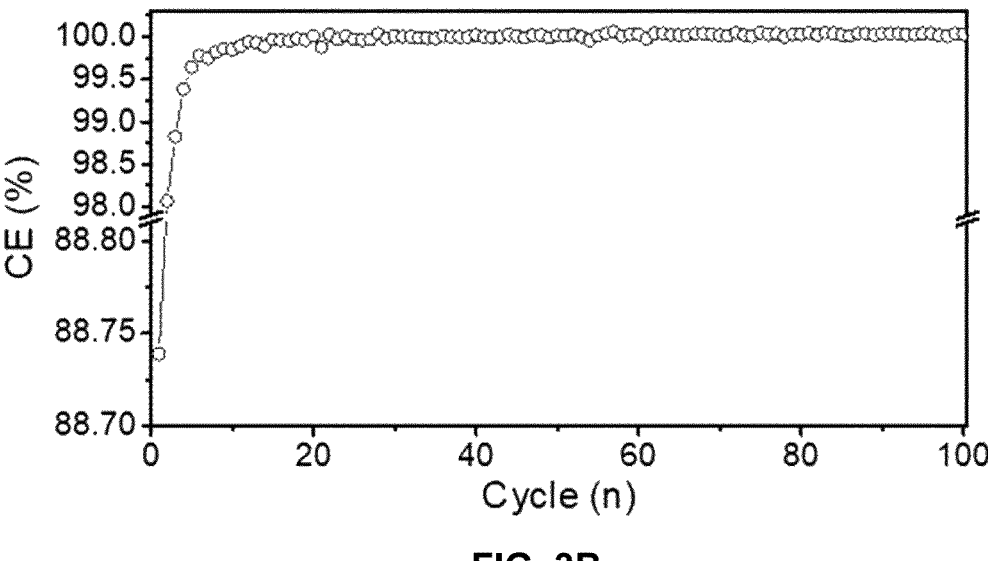
FIG. 3B shows the result of evaluation of the lifespan of the half-battery in Example 1 according to an exemplary embodiment of the present invention.

FIG. 3B illustrates the evaluation of the lifespan of the half-battery. The half-battery has an initial efficiency of 88.7% and an average coulombic efficiency of about 99% or more for 100 cycles.

Figure 4A:
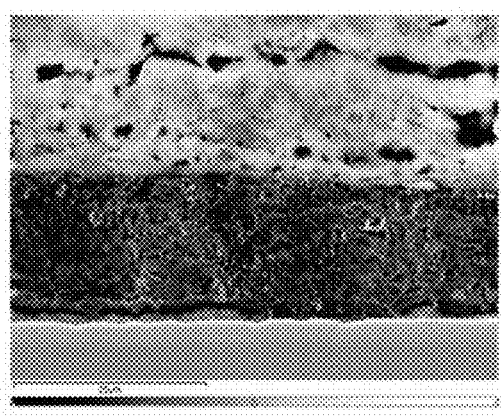
FIG. 4A shows the result of scanning electron microscope (SEM) analysis of the cross-section of the half-battery in Example 1 according to an exemplary embodiment of the present invention that is charged.
Figure 4B:
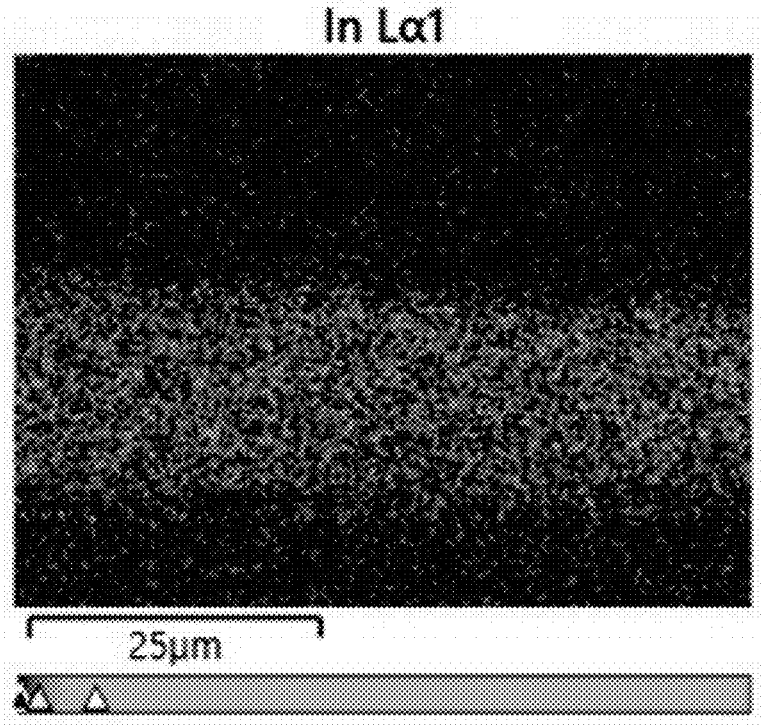
FIG. 4B shows the result of energy-dispersive X-ray spectroscopy (EDS) analysis with respect to the same cross-section as that of FIG. 4A.

FIG. 4A shows the result of scanning electron microscope (SEM) analysis of the cross-section of the half-battery that was charged. A total of three layers can be seen from FIG. 4A, and the solid electrolyte layer, the lithium storage layer, and the anode current collector were laminated in that order from the top. FIG. 4B illustrates the result of energy-dispersive X-ray spectroscopy (EDS) analysis of the same cross-section as that shown in FIG. 4A. The lithium was uniformly deposited between the solid electrolyte layer and the anode current collector.

The half-battery was charged and discharged at a temperature of about 25° C. under the conditions of a current density of 1 mA/cm$^2$ and a deposition capacity of 3 mAh/cm$^2$.

Figure 5A:
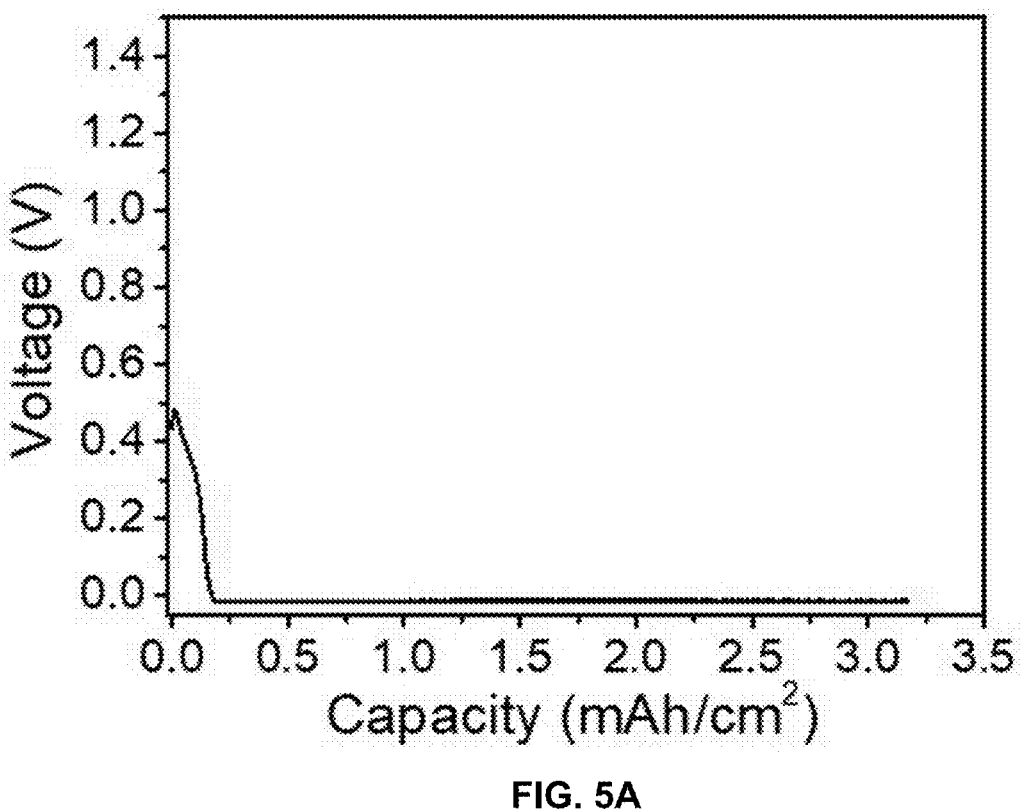
FIG. 5A shows a first discharge graph of the half-battery in Example 1 according to an exemplary embodiment of the present invention that is charged and discharged at room temperature.

FIG. 5A shows a first discharge graph of the half-battery and the half-battery exhibited a capacity even at room temperature.

Figure 5B:
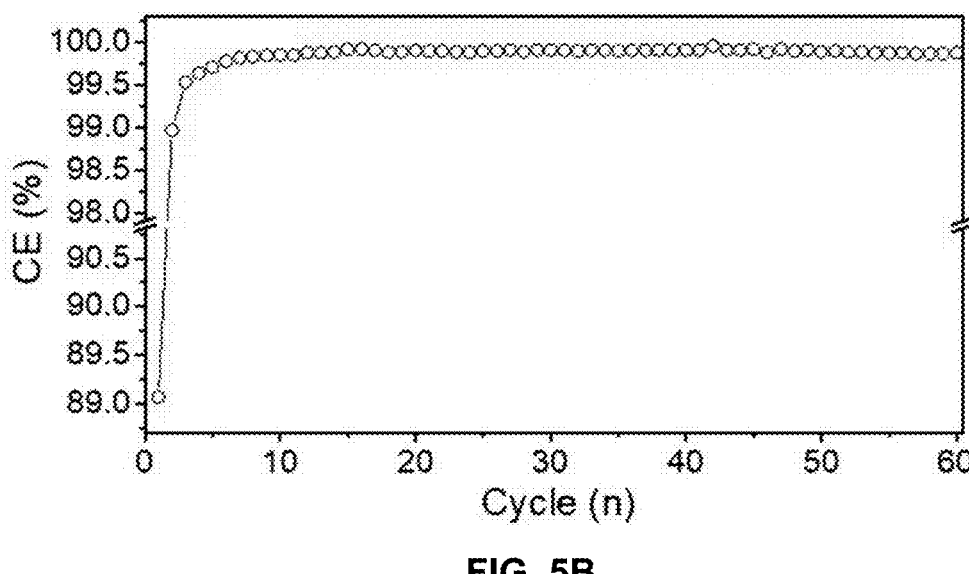
FIG. 5B shows the result of evaluation of the lifespan of the half-battery in Example 1 according to an exemplary embodiment of the present invention that is charged and discharged at room temperature.

FIG. 5B illustrates the result of evaluation of the lifespan of the half-battery. The half-battery exhibited an average coulombic efficiency of about 99% or greater for 60 cycles even when operated at room temperature.

Example 2

An all-solid-state battery was manufactured in the same manner as in Example 1, except that a cathode including a cathode active material was used instead of lithium metal. The all-solid-state battery was charged and discharged at a temperature of about 25° C. to evaluate the capacity and lifespan thereof.

Figure 6A:
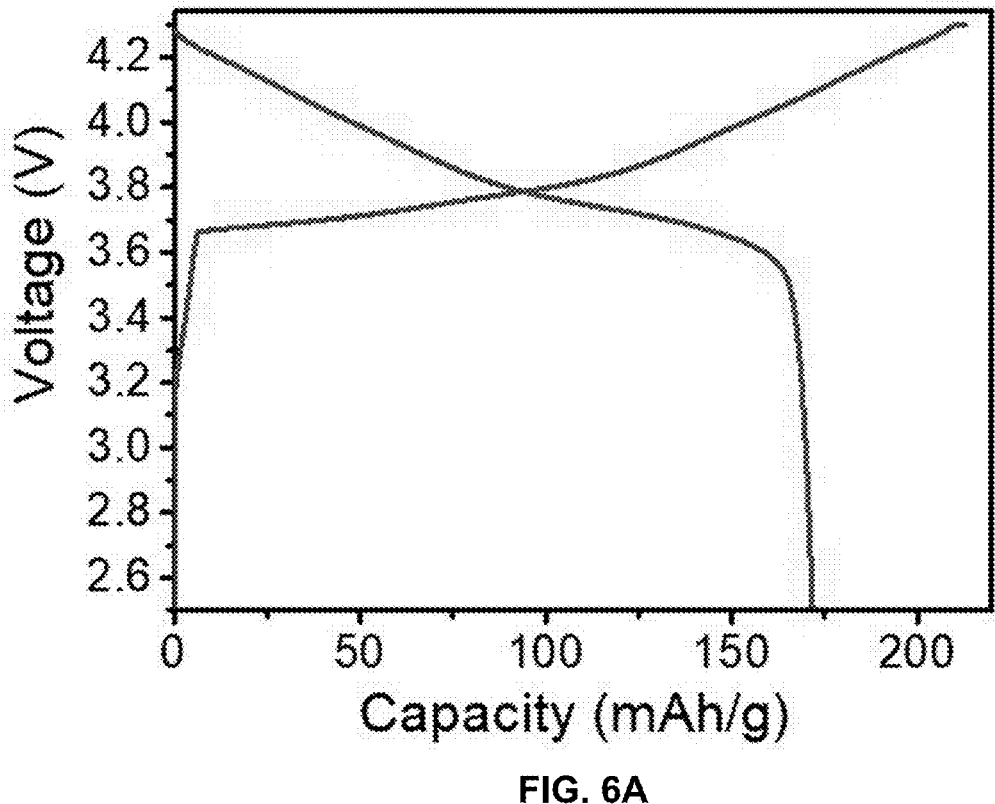
FIG. 6A shows a first discharge graph of an all-solid-state battery in Example 2 according to an exemplary embodiment of the present invention.

FIG. 6A shows a first discharge graph of the all-solid-state battery. The all-solid-state battery exhibited a reversible capacity of about 170 mAh/g or more when operated at room temperature.

Figure 6B:
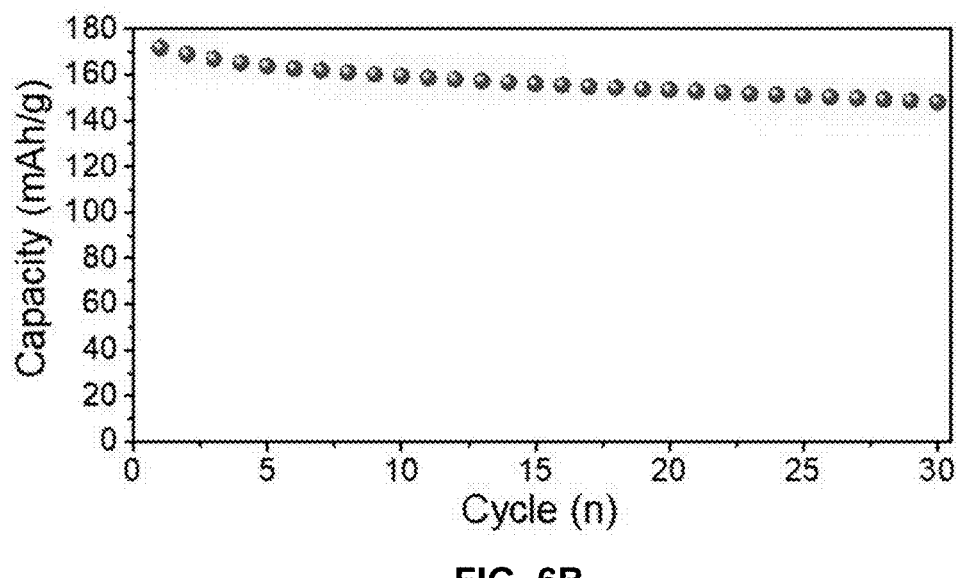
FIG. 6B shows the result of evaluation of the lifetime of the all-solid-state battery in Example 2 according to an exemplary embodiment of the present invention.

FIG. 6B illustrates the result of evaluation of the lifetime of the all-solid-state battery and, the all-solid-state battery could be charged and discharged for 30 cycles or more, and exhibits capacity retention of about 99% or more.

Example 3

A half-battery was manufactured in the same manner as in Example 1, except that ZnF$_2$ was used as the metal fluoride.

The half-battery was charged and discharged at a temperature of about 60° C. under the conditions of a current density of 1 mA/cm$^2$ and a deposition capacity of 3 mAh/cm$^2$.

Figure 7A:
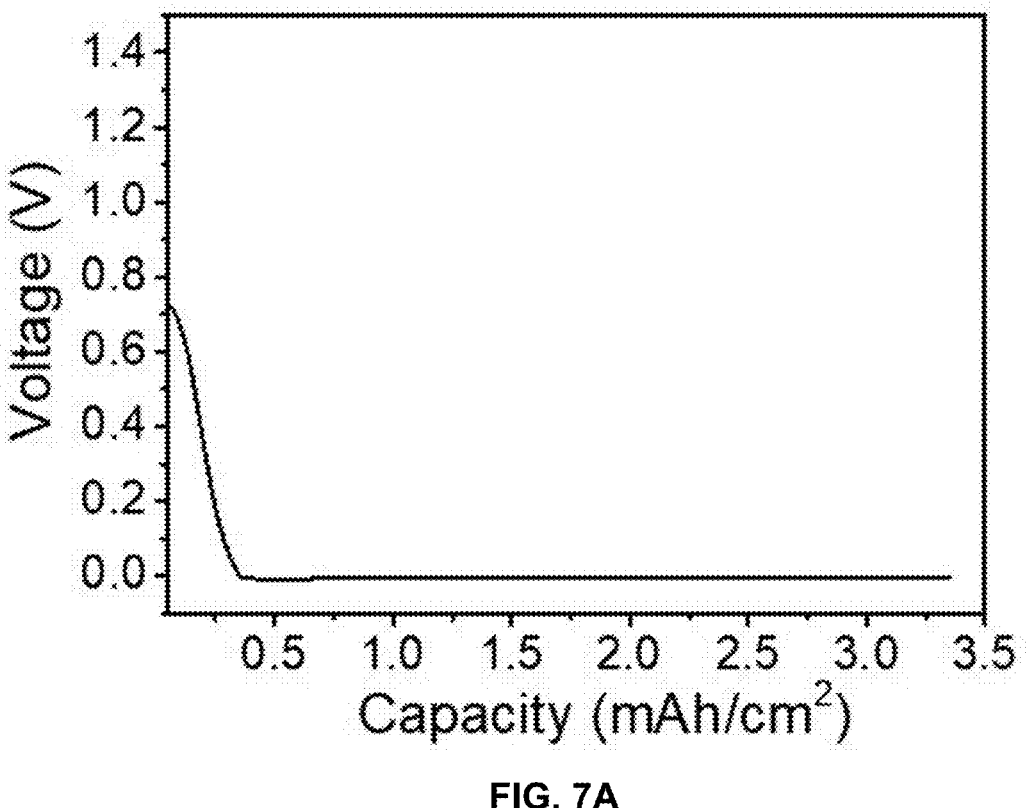
FIG. 7A shows a first discharge graph of a half-battery in Example 3 according to an exemplary embodiment of the present invention.

FIG. 7A shows a first discharge graph of the half-battery and, the half-battery exhibited a capacity of 0.3 mAh/cm$^2$ at a voltage greater than 0V during initial discharge. This means that ZnF$_2$ reacted electrochemically with lithium ions. In addition, when the coating layer containing ZnF$_2$ was introduced, the half-battery was stably operated at 0V or less without overvoltage.

Figure 7B:
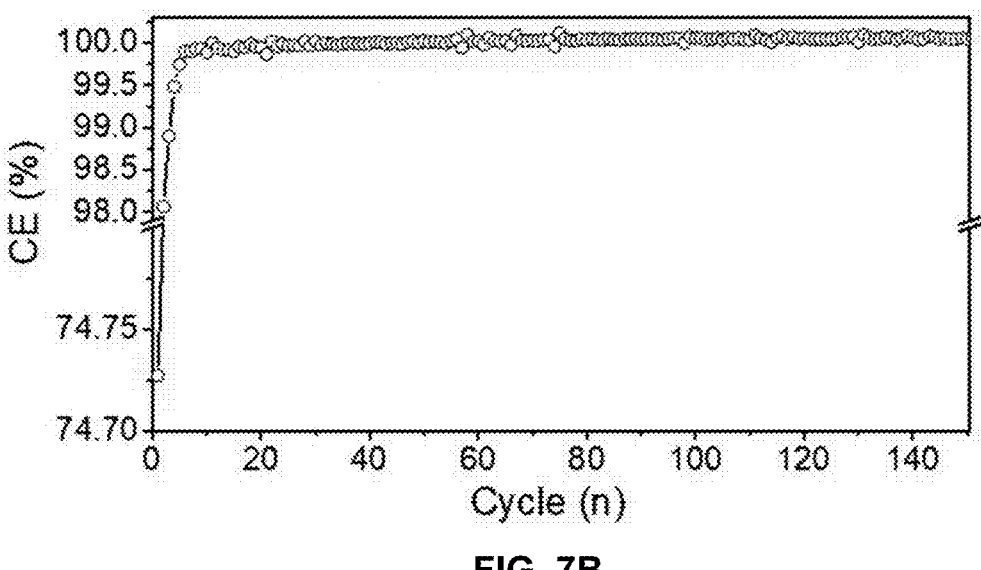
FIG. 7B shows the result of evaluation of the lifespan of the half-battery in Example 3 according to an exemplary embodiment of the present invention.

FIG. 7B shows the evaluation of the lifespan of the half-battery. The half-battery had an initial efficiency of 74.7% and an average coulombic efficiency of about 99% or greater for 150 cycles.

Example 4

A half-battery was manufactured in the same manner as in Example 1, except that AgF was used as the metal fluoride.

The half-battery was charged and discharged at a temperature of about 60° C. under the conditions of a current density of 1 mA/cm$^2$ and a deposition capacity of 3 mAh/cm$^2$.

Figure 8:
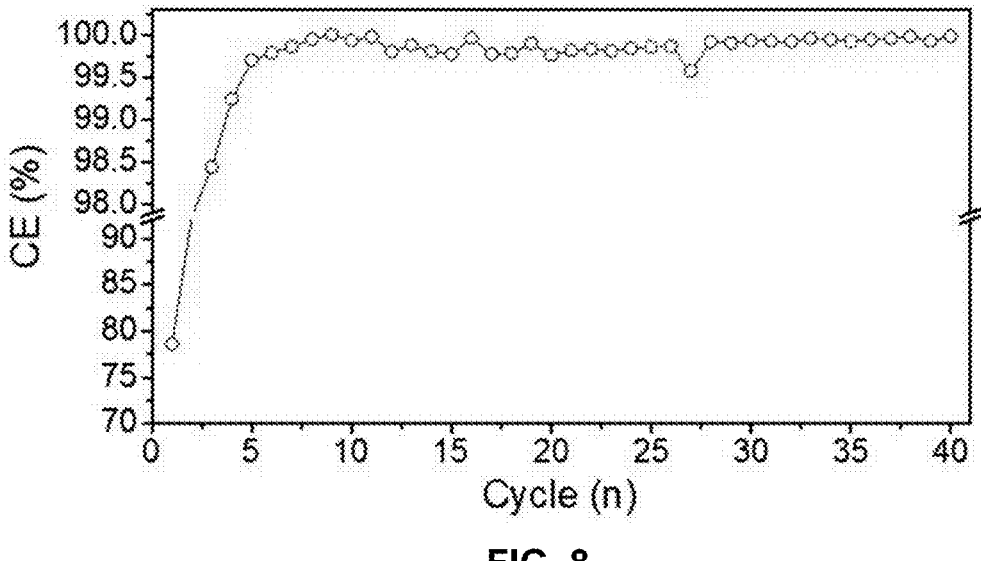
FIG. 8 shows the result of evaluation of the lifespan of a half-battery in Example 4 according to an exemplary embodiment of the present invention.

FIG. 8 shows the evaluation of the lifespan of the half-battery. The half-battery had an initial efficiency of 78.6% and an average coulombic efficiency of about 99% or more for 40 cycles.

According to various exemplary embodiments of the an anode-free all-solid-state battery that is capable of depositing lithium on an anode current collector during charging can be provided.

According to various exemplary embodiments of the present invention, also provided is an anode-free all-solid-state battery that is capable of effectively inhibiting the growth of lithium dendrites during charging.

Further, according to various exemplary embodiments of the preset invention, provided is an anode-free all-solid-state battery that is capable of exhibiting a satisfactory capacity and lifespan even when operating at low temperatures.

The effects of the present invention are not limited to those mentioned above. It should be understood that the effects of the present invention include all effects that can be inferred from the description of the present invention.

The present invention has been described in detail with reference to exemplary embodiments thereof. However, it will be appreciated by those skilled in the art that changes may be made in these embodiments without departing from the principles and spirit of the present invention, the scope of which is defined in the appended claims and their equivalents.

What is claimed is:

1. An anode-free all-solid-state battery comprising:
   a solid electrolyte layer;
   a cathode layer disposed on a first surface of the solid electrolyte layer and comprising a cathode active material;
   an anode current collector disposed on a second surface of the solid electrolyte layer; and
   a coating layer disposed between the anode current collector and the solid electrolyte and comprising a metal fluoride,
   wherein the first surface of the solid electrolyte layer and the second surface of the solid electrolyte layer face in opposite direction,
   wherein the coating layer further comprises binders, and
   wherein the binders is consisting of one or more compound selected from butadiene rubber (BR), nitrile butadiene rubber (NBR), hydrogenated nitrile butadiene rubber (difluoride (PVDF), polytetrafluoroethylene (PTFE), carboxymethylcellulose (CMC), and polyethylene oxide (PEO), wherein the coating layer comprises:

an amount of about 90 to 99% by weight of the metal fluoride; and an amount of about 1 to 10% by weight of the binder, wherein the % by weight is based on the total weight of the coating layer.

2. The anode-free all-solid-state battery according to claim 1, wherein the metal fluoride comprises a compound having Formula 1:

$$MF_x \qquad \text{[Formula 1]}$$

wherein M comprises one or more selected from the group consisting of Zn, In, Ag, Mg, Ca, Sn, Bi, Sb, Ga, Ge, and Al; and x is an integer from 1 to 4.

3. The anode-free all-solid-state battery according to claim 1, wherein the metal fluoride comprises $InF_3$.

4. The anode-free all-solid-state battery according to claim 1, wherein the metal fluoride comprises $ZnF_2$.

5. The anode-free all-solid-state battery according to claim 1, wherein the metal fluoride comprises AgF.

6. The anode-free all-solid-state battery according to claim 1, wherein the metal fluoride has a particle size (D50) of about 10 nm to 5 µm.

7. The anode-free all-solid-state battery according to claim 1, wherein the coating layer does not comprise a carbon material.

8. The anode-free all-solid-state battery according to claim 1, wherein the coating layer has a thickness of about 0.1 µm to 20 µm.

9. The anode-free all-solid-state battery according to claim 1, wherein, when charging the anode-free all-solid-state battery, a lithium storage layer comprising lithium metal, a lithium alloy, and lithium fluoride (LiF) is formed between the solid electrolyte layer and the anode current collector.

10. The anode-free all-solid-state battery according to claim 1, wherein the anode-free all-solid-state battery has a capacity of about 140 mAh/g or greater based on the weight of the cathode active material when operated at a temperature of about 10° C. to 50° C.

11. The anode-free all-solid-state battery according to claim 1, wherein the anode-free all-solid-state battery has a capacity retention of about 80% or greater for about 30 charge/discharge cycles when operated at a temperature of about 10° C. to 50° C.

12. A vehicle comprising the battery of claim 1.

* * * * *